(12) United States Patent
Lipowicz

(10) Patent No.: US 6,748,306 B2
(45) Date of Patent: Jun. 8, 2004

(54) DOCUMENT COMMUNICATION SYSTEMS FOR USE IN AUTOMOBILES

(75) Inventor: Robert F. Lipowicz, Fairport, NY (US)

(73) Assignee: Xerox Corporation, Stamford, CT (US)

(*) Notice: Subject to any disclaimer, the term of this patent is extended or adjusted under 35 U.S.C. 154(b) by 40 days.

(21) Appl. No.: 09/894,488

(22) Filed: Jun. 28, 2001

(65) Prior Publication Data
US 2003/0004626 A1 Jan. 2, 2003

(51) Int. Cl.[7] .............................................. H04M 11/00
(52) U.S. Cl. ................. 701/36; 342/357.1; 342/357.13; 455/426; 455/462
(58) Field of Search ........................... 701/36, 301, 27, 701/98, 214, 23, 24, 33; 340/903, 436, 902, 988, 425.5, 539; 342/455; 455/462, 557; 348/358

(56) References Cited

U.S. PATENT DOCUMENTS

| | | | |
|---|---|---|---|
| 4,896,190 A | | 1/1990 | Uehida et al. ............... 355/202 |
| 5,420,701 A | | 5/1995 | Terashima et al. ........... 358/498 |
| 5,862,321 A | | 1/1999 | Lamming et al. ......... 395/200.3 |
| 5,983,161 A | * | 11/1999 | Lemelson et al. ........... 701/301 |
| 6,035,205 A | * | 3/2000 | Han ............................. 455/462 |
| 6,087,965 A | * | 7/2000 | Murphy ....................... 340/991 |
| 6,141,608 A | * | 10/2000 | Rother ......................... 701/33 |
| 6,243,646 B1 | * | 6/2001 | Ozaki et al. ................. 701/211 |
| 6,262,764 B1 | * | 7/2001 | Perterson ..................... 348/148 |
| 6,313,791 B1 | * | 11/2001 | Klanke .................... 342/357.17 |
| 6,377,210 B1 | * | 4/2002 | Moore .................... 342/357.13 |
| 6,480,587 B1 | * | 11/2002 | Rao et al. .............. 379/110.01 |
| 2001/0035683 A1 | * | 11/2001 | Yearwood et al. ......... 307/10.1 |
| 2002/0007306 A1 | * | 1/2002 | Granger et al. ............... 705/14 |
| 2002/0036565 A1 | * | 3/2002 | Monroe .................... 340/425.5 |

OTHER PUBLICATIONS

"About OnStar: FAQ" —http://www.onstar.com/visitors/html/ao_fag.htm—(6 pages), no date.
"Xerox Launches Industry's First System to Send Documents by Cell Phones, Pagers"—Feb. 22, 2000—(4 pages).

* cited by examiner

Primary Examiner—Thomas G. Black
Assistant Examiner—Tuan C To
(74) Attorney, Agent, or Firm—R. Hutter

(57) ABSTRACT

A document device, including an input scanner and printer, is installed in an automobile. The document device can transmit and receive image data wirelessly, and further interacts with a Global Positioning System (GPS) device within the automobile to determine the location of the automobile. Aspects of documents based on received image data, and the destinations of transmitted image data, can be made dependent on the location of the automobile at any time. Received image data is retained in memory and printed out when the car is in a predetermined condition, such as being turned on.

16 Claims, 2 Drawing Sheets

DOCUMENT COMMUNICATION SYSTEMS FOR USE IN AUTOMOBILES

CROSS-REFERENCE TO RELATED APPLICATION

Cross-reference is hereby made to the following application, assigned to the assignee hereof: U.S. Ser. No. 09/449,346, filed Nov. 24, 1999, entitled "Using Positioning as a Tool for Locating Publicly Available Resources and now abandoned."

FIELD OF THE INVENTION

The present invention relates to the transmission of documents in the context of document devices, such as printers and scanners, which are installed in automobiles.

BACKGROUND OF THE INVENTION

Document devices exploiting digital technology, such as electronic printers, input scanners, facsimiles, digital copiers, and the like, are well known in the office context. Another possible useful context for such document devices is in automobiles. In the automobile context, certain unique requirements and opportunities arise which are not anticipated in the office context. The present invention is directed to systems and methods which address these requirements and opportunities.

DESCRIPTION OF THE PRIOR ART

U.S. Pat. Nos. 4,896,190 and 5,420,701 show designs of highly miniaturized, battery-powered document devices, such as usable as facsimile devices.

The MobileDoc™ system, described in a press release entitled "Xerox® Launches Industry's First System to Send Documents by Cell Phones, Pagers," describes a wireless means for transmitting and retrieving image data relating to documents. An overview of the system is shown in U.S. Pat. No. 5,862,321.

The OnStar™ system, information about which is available as of the filing hereof at www.onstar.com, is a system in which a central information source, which may include a human advisor, can directly contact a particular automobile and interact with the automobile, such as by remotely unlocking doors, or detecting that the airbags have been activated. The means for this contact can be through a direct satellite connection, or a public cellular-phone system.

SUMMARY OF THE INVENTION

According to one aspect of the invention, there is provided a method of operating a document device installed in an automobile, the document device including a printer, a memory, and means for accepting external signals, comprising the steps of accepting external signals and storing the external signals as input image data in the memory, and when the automobile is turned on, indicating that input image data is in the memory.

According to another aspect of the invention, there is provided a method of operating a document device installed in an automobile, the document device including a selection interface, printer, a memory, and a transceiver for sending and accepting signals, comprising the steps of selecting, at the selection interface, a title relating to a data set; sending a signal related to the title to a station; and receiving from the station image signals related to the title, the printer printing an image based on the image signals.

According to another aspect of the invention, there is provided a method of operating a document device installed in an automobile, the document device including a printer, comprising the steps of accepting an instruction from outside the automobile; and, as a result of receiving said instruction, making image data available to be printed by the printer.

According to another aspect of the invention, there is provided a method of communicating to a document device, the document device including a printer, comprising the steps of wirelessly transmitting to the document device an instruction; and, as a result of receiving said instruction, the document device making image data available to be printed by the printer.

According to another aspect of the invention, there is provided a method of operating a document device, the document device having associated therewith an input scanner for recording image data, means for determining a location of the document device, and means for transmitting image data comprising the steps of: recording image data; determining a location of the document device; selecting a destination a result of the determining step; and wirelessly transmitting at least a portion of the image data to the selected destination.

DETAILED DESCRIPTION OF THE INVENTION

Prefatory to a discussion of an embodiment of the present invention, the following terms used in the specification and claims herein shall be defined.

"Installed" shall mean connected to an electrical system which is otherwise significantly operative of an automobile. The electrical system can be functional to at least some extent when the automobile is not in use.

A "predetermined operating condition" of an automobile can be any condition in which an automobile may be, such as: off, on, moving, on but stationary, on but having been stationary for a predetermined period of time, in gear or in park or neutral, etc. "Turned on" shall mean that the automobile is being interacted with by a user; it need not mean that the engine of the automobile is running.

"Signals" or "image signals" shall mean electrical or wireless signals which can in some way be interpreted as image data. As such, the signals can be in a CCITT facsimile format, a digital format such as TIFF, ASCII, Microsoft® Word™, pdf, JPEG, or any format that comes into use.

A "printer" shall be defined as a set of hardware and software which accepts data of any format or combination of formats and renders therefrom an image on a substrate, such as paper. Any printing technology, such as xerography or ink-jet, can be contemplated. Typically such a printer will include a paper supply.

An "input scanner" or "scanner" is any device which records an image and renders it as digital data. Typically such a scanner includes a paper feeding mechanism and a photosensitive device. In the claims, the term "scanner" can include digital cameras of any kind.

"Station-to-station communication" means communication between a source and a specifically addressed destination. Examples of this include cellular telephony or electronic mail, although other types of communication may come under this definition.

"Direct wireless communication" means wireless communication from a wireless (such as radio, microwave, or IR) transmitter to one or a large number of possible receivers. This term includes ground- or satellite-based systems.

"Displaying" can mean any type of visual, audio or other direct communication to a human user. As such, the term can include showing a message on an electronic (such as LCD) display, printing out a message with a printer, or giving an audio signal.

The "title" associated with any set of data is any relatively small set of data (such as a few words) which identifies, or even notes the existence of (e.g., "You have electronic mail"), a larger set of data.

A "selection interface" is any means by which a user in an automobile can interact with the document device in the automobile, such as use of hard buttons, touchscreen, voice commands, or submitting a hard-copy sheet with instructions thereon to a scanner.

Figure 1:
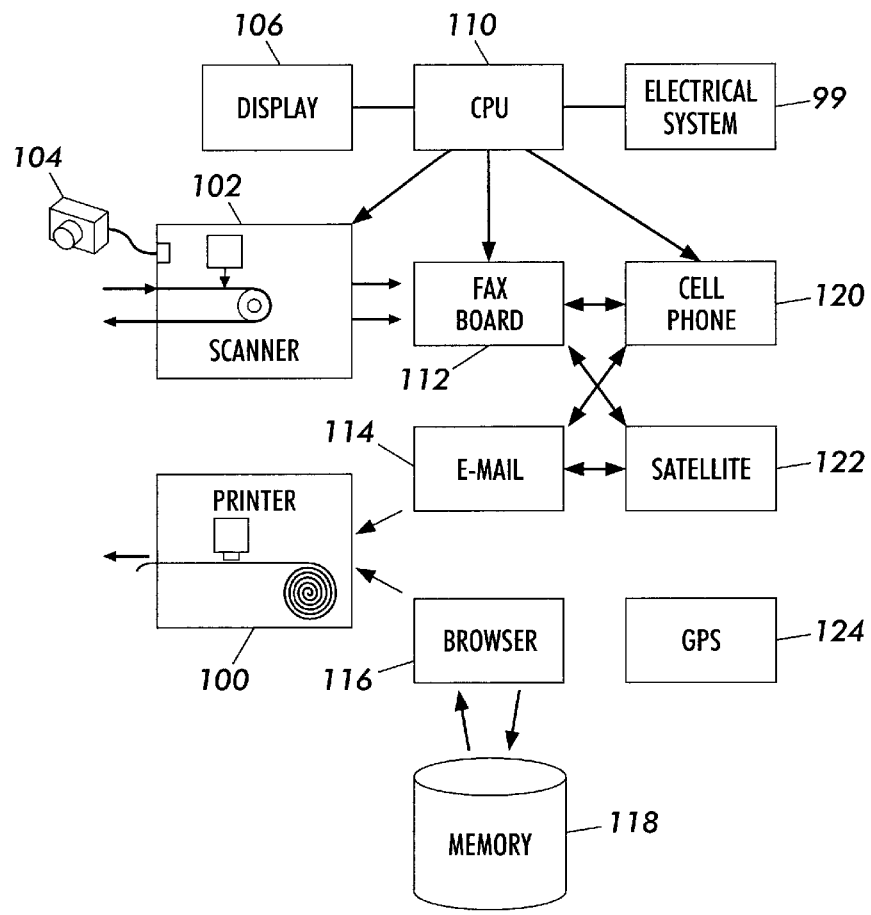
FIG. 1 is a systems view of various elements of a "document device" according to an embodiment of the present invention.

FIG. 1 is a systems view of various elements of what can be called a "document device" according to an embodiment of the present invention. The document device is intended to be installed in an automobile, as described above. The document device is operatively associated with electrical system 99 of a particular automobile.

The main hardware elements of a typical document device are a printer 100, input scanner 102 (which could accept inputs from a digital camera such as 104), and a display 106. As will be shown below, these hardware elements are advantageously These elements are controlled via a CPU 110, although depending on a particular implementation, the CPU can comprise one or more microprocessors or other devices.

The CPU 110 further controls other data-handling elements, which in turn can accept data from scanner 102 or send data to printer 100. Such elements can include a fax board 112, an e-mail server 114, and a browser 116. As is well known, any of these elements can be comprised of hardware and software for its purpose. Any of these elements can in turn make use of an on-board memory 118, which can be of any type (or combination of types) known in the art, specific uses of which will be described in detail below.

The CPU 110 further controls communication devices, for sending or receiving data of various formats and types from outside the automobile. Among these devices, according to various implementations, can be a cellular telephone device 120, a satellite or other direct-wireless transceiver 122, and a device 124 for exploiting the Global Positioning System (GPS), such as to locate the automobile at a point on the Earth. Data going to or from these devices can interact with the data-handling elements as needed.

Figure 2:
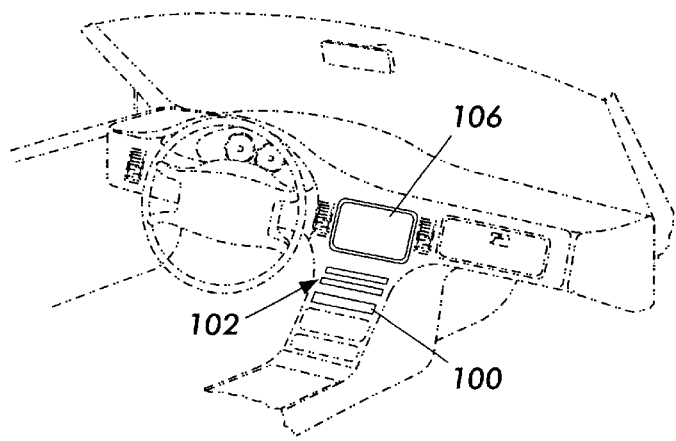
FIG. 2 shows how a document device such as shown in FIG. 1 would look as installed in the dashboard of an automobile.

FIG. 2 shows how a document device such as shown in FIG. 1 would look as installed in the dashboard of an automobile. Slots for paper output from printer 100 and circulation of sheets through scanner 102 are apparent, as well as display 106, which can be in the form of a touchscreen.

A document device, having any or all of the above-described elements, can perform functions which are uniquely suited for the context of communicating to and from an automobile. A number of scenarios, and how the document device operates within them according to the present invention, will be described.

One unique situation which occurs when a document device is installed in an automobile is if image data is submitted from an external source while the car is effectively "off." With modern automobiles, there is always residual electrical activity (clock, alarm system) going on even when the key is not in the ignition and the engine is off; but to print out a document (such as an incoming facsimile) while the car is in such a condition may cause an unacceptable drain on the car's battery.

According to one aspect of the present invention, image data of whatever format entering the automobile by whatever means (cell phone 120, satellite transceiver 122, etc.) is stored in memory 118. When the car is subsequently turned on, the display 106 shows a message to the effect that a facsimile, e-mail message or satellite broadcast message has arrived in memory, and solicits the user to print out the related image. The user can assent to the printout through a selection interface, as defined above. The image data is then accessed from memory 118 and printed out via printer 100. Alternately, printout of all received e-mails, faxes, and other messages can be made automatic upon turning on the car.

In some jurisdictions, certain activities, such as use of a telephone, which may interfere with use of a car, may be forbidden. For safety reasons, the apparatus according to the present invention may provide restrictions on the use of certain aspects of the apparatus, depending on the operating condition of the automobile at a given time. For example, a display 116 may be disabled when the car is moving, in gear, or if the motor is running, so that a driver of the car will not be distracted by the display. If the display 116 is thus unavailable at a particular time, a message that would be displayed for any reason can alternately be printed out via printer 100; or, the system can wait until the car is stationary (either when detecting the car is in park, or if the car has been stationary for a certain amount of time) before displaying a message. Alternately, messages which would otherwise be displayed can be converted, such as through voice-simulation-technology accessible to CPU 110, to audio messages played to the driver while the car is moving.

Another scenario facilitated by the document device is remote retrieval of documents. A user in an automobile who wishes to obtain a document from a remote source (such as the computer at some home base) can contact the source by means such as cell phone 120: in such a case, the user can deal with a human representative at the source, or perhaps dial in a special number through the phone system. In response thereto, the source sends the desired image data to the document device in any format, such as facsimile, ASCII, or pdf.

A variation of this scenario is that the source sends the desired information which is subsequently combined with image data pre-stored in memory 118, yielding a complete document. This method is useful when printing sales collaterals: information relating the standard brochure for a product being sold can be retained in memory 118, while up-to-date pricing or availability information is sent upon request. The pricing information can be delivered to the document device in a highly space-efficient format, such as ASCII characters, which are then formatted within a larger document having a more sophisticated format such as pdf, yielding a seamless image.

Another variation of the remote-retrieval concept is to have the user in the car directly access a desired image to be printed, by navigating the World-Wide Web. The most straightforward way to do this, given the state of common technology at the time of filing hereof, would be to use the cell-phone device 120 as a fax modem to a laptop or other computer within the car. As this may prove expensive, a service could be provided in which communication to and from the car, either through cell-phone or other technology, is minimized given a particular purpose, with the "service," residing at a home base, performing any communication-intensive activities. For instance, if a salesman in a car wanted a relatively unusual document from the internet (sales collateral from a competitor's website, for example), instead of navigating the internet in a manner which could consume a large amount of cell-phone time, he contacts the service and selects, either by speaking with or faxing to a human representative or by using a relatively simple selection screen on display 116 (or even using a paper-based checklist interface scanned into scanner 102) a general request of a type of information he wants. Subsequently, the service locates the desired data and sends it to the car in whatever format (fax, ASCII, pdf, etc.) is most desirable under a given set of circumstances. The data can arrive at the car while the car is moving or parked, to be made available for printing when the car is in a predetermined operating condition (the car being turned on, if the car were parked when the data arrived; or the car becoming parked, if the car were moving when the data arrived). It is also possible that a user in a first car could request of the service that the desired data be sent to a second car.

The GPS capability within an automobile, such as provided by GPS device 124 within a particular automobile, can facilitate another scenario, the printing of location-based documents. GPS device 124 can inform CPU 110 of the precise location of the automobile at all times. This information can be exploited in situations where an image is desired to be sent only to automobiles within a certain area. For instance, if a central office wanted to send a document to only those automobiles in the Chicago metropolitan area, the data for the document could be broadcast by satellite or broadcast-faxed to in effect every car in a much wider area, along with an instruction for each document device to retain the data in memory 118 for printing only if the automobile is in the desired geographical range, as determined by the GPS device 124 within each car. Those cars which are determined, by their on-board GPS devices, to be outside the desired geographical range, may receive data, but (depending on the specific implementation, as manifested in their CPU's) will not store the data in memory 118, or will accept the data but not solicit the user to print it out.

Figure 3:
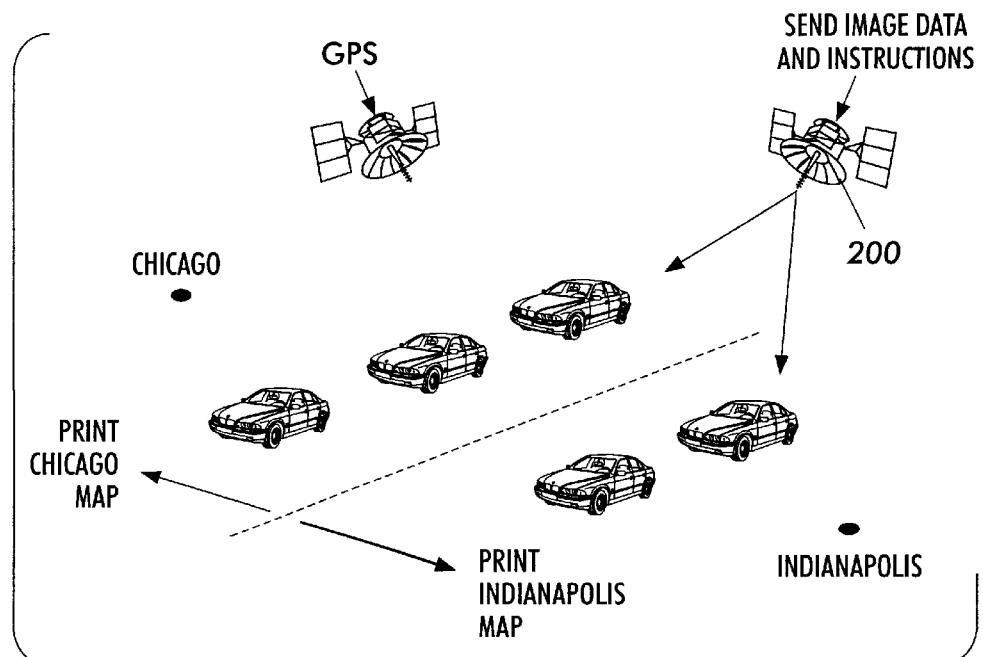
FIG. 3 shows a scenario of location-dependent printing according to one aspect of the present invention.

A more sophisticated variation of location-based documents is to cause the document devices in each of a population of cars to print somewhat different documents depending on the determined location of each car as determined by the GPS device 124. An overview of the location-dependent printing scenario is shown in FIG. 3. For instance, a central office wants to call a set of emergency meetings of its sales force who are out in a fleet of automobiles. Salesmen should report to the local office closest to where they happen to be at the moment. Using the document device of the present invention in each car, a single broadcast message (fax or satellite) is sent out to the fleet, and within each document device the GPS location is noted. Depending on the determined location of a particular document device, different subsets of the total broadcast message can be printed, most likely only those portions of the broadcast message relevant to persons within a particular area (in the claim language, this comes under the category of "affecting an aspect" of the image signals to be printed). In the sales force example, those cars which are near Chicago would have printed out for them (through printer 100) only a map showing how to get to the Chicago meeting, while cars near Indianapolis would have printed out only a map showing how to get to the Indianapolis meeting, and cars in neither area would not have printed out anything; yet, in the single broadcast message, information relating to both meetings would have been sent.

Within each car in a population of cars spread over a geographical area, discriminating software within CPU 110 receives from the central source (either through satellite communication or a broadcast fax) a single message, comprising image data in any format, which has further associated therewith special instructions about the location dependence of the message. The potentially printable portion of the message is retained in memory 118. The special instructions are addressed to appropriate software controlled by CPU 110. These special instructions can be summarized as: if location of car=[predetermined geographical area], then retrieve from memory and print [predetermined subset of message data]; there can be as many if-then statements as different location-specific versions of the message.

A variation of the technique is to have a central source send only the special instructions to the population of cars, and have the printable image data pre-loaded in memory 118: in other words, the central source would simply instruct the document device in each car to print out a pre-loaded message (the nature of which may be made dependent on the location of the car as determined by the GPS device in each car). Once again, in this and all scenarios, if a particular car is "off" when the device therein receives the message or instructions, when the car is turned on, the device displays a message to the user that a message has been received, and the user will have the option to print it out.

Figure 4:
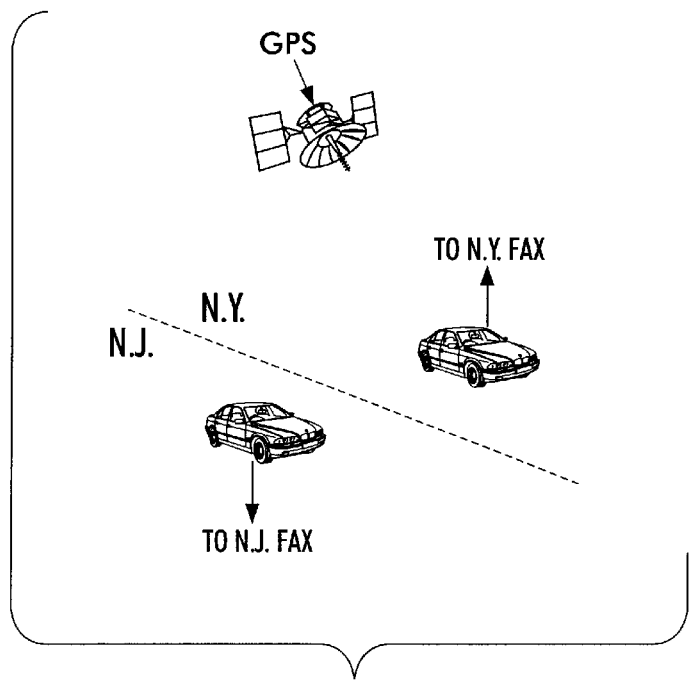
FIG. 4 shows a scenario of location-dependent scanning and image transmission according to one aspect of the present invention.

Another set of scenarios according to the present invention involve location-based input scanning services. If it is desired to record a hard-copy document image through scanner 102, or other types of image through digital camera 104, the resulting image data can be sent (in any format, such as facsimile, ASCII or pdf characters as a result of an optical character recognition process, etc.) to an external location in a manner which is dependent on the location of the document device at the time of the scanning operation, as determined by GPS device 124. A simple implementation of the above scenario is shown in FIG. 4. For instance, if an insurance adjuster operating from her automobile wishes to transmit an image of an auto insurance card from some essentially random location, information from the GPS device 124 at the time of scanning can be used both to provide a time and location stamping of the transmission of the image data; and further, to enable the destination of the scanned image data to be automatically and invisibly dependent on the location from which the information was scanned. If the insurance company is set up so that car accidents which occur in New York should be reported to one fax number, while accidents which occur in New Jersey should be reported to another fax number. (The system could also conceivably work with a scan-to-e-mail system.) Assuming the adjuster will be scanning and transmitting the insurance cards from a location very close to the accident scene, the GPS system can be used to determine the exact location of the accident, and thereby direct the information to the correct fax number, all invisibly to the adjuster using the document device in her car.

At a single automobile at some location detectable by the GPS system, a hard-copy document or digital photograph is scanned or entered into memory 118. When the user hits a send instruction, the GPS device 124 within the car tells software controlled by the CPU 110 the current location of the automobile. The software has any number of if-then commands, each of which looks generally like: if location of car=[predetermined geographic zone], then send image data to [predetermined fax or e-mail destination].

What is claimed is:

1. A method of operating a document device installed in an automobile, the document device including a printer, a memory, and means for accepting external signals, comprising the steps of:

accepting external signals and storing the external signals as input image data in the memory;

determining an operating condition of the automobile; and as a result of the automobile being in a predetermined operating condition, indicating that input image data is in the memory.

2. The method of claim 1, wherein the predetermined operating condition is that the automobile is turned on.

3. The method of claim 1, further comprising the step of printing the input image data in the memory.

4. The method of claim 3, the printing step further comprising the step of combining the input image data with pre-stored image data in the memory to yield a printed document.

5. The method of claim 1, further comprising the step of printing the input image data in the memory in response to the automobile being in a predetermined operating condition.

6. The method of claim 5, wherein the predetermined operating condition for the printing step is that the automobile is stationary.

7. A method of operating a document device installed in an automobile, the document device including a printer, a memory, and means for accepting external signals, comprising the steps of:

accepting external signals and storing the external signals as input image data in the memory;

when the automobile is in a predetermined operating condition, indicating that input image data is in the memory; and displaying a title related to a set of input image data in the memory.

8. The method of claim 7, wherein the displaying step occurs in response to the automobile being in a predetermined operating condition.

9. The method of claim 8, wherein the predetermined operating condition for the displaying step is that the automobile is stationary.

10. The method of claim 1, further comprising the steps of determining a location of the automobile; and affecting an aspect of the input image data in memory as a result of said determination.

11. The method of claim 1, wherein the predetermined operating condition is that the automobile is stationary.

12. The method of claim 8, wherein the predetermined operating condition is that the automobile is turned on.

13. The method of claim 1, further comprising providing a selection interface to enable a user to cause printing an image related to the input image data.

14. The method of claim 1, further comprising determining that the automobile is stationary; and printing an image related to the input image data if the automobile is stationary.

15. The method of claim 7, further comprising providing a selection interface to enable a user to cause printing an image related to the input image data.

16. The method of claim 7, further comprising determining that the automobile is stationary; and printing an image related to the input image data if the automobile is stationary.

* * * * *